United States Patent
Yamada et al.

(10) Patent No.: US 8,517,843 B2
(45) Date of Patent: Aug. 27, 2013

(54) TORQUE LIMITING DEVICE

(75) Inventors: Koichi Yamada, Tokyo (JP); Yoshinori Taketani, Tokyo (JP)

(73) Assignee: Mitsubishi Nichiyu Forklift Co., Ltd., Kyoto (JP)

( * ) Notice: Subject to any disclaimer, the term of this patent is extended or adjusted under 35 U.S.C. 154(b) by 31 days.

(21) Appl. No.: 13/258,819

(22) PCT Filed: Apr. 13, 2010

(86) PCT No.: PCT/JP2010/056580
§ 371 (c)(1),
(2), (4) Date: Oct. 14, 2011

(87) PCT Pub. No.: WO2011/001731
PCT Pub. Date: Jan. 6, 2011

(65) Prior Publication Data
US 2012/0018272 A1    Jan. 26, 2012

(30) Foreign Application Priority Data
Jun. 30, 2009    (JP) .................. 2009-155342

(51) Int. Cl.
*F16D 7/02*    (2006.01)
*F16D 43/21*    (2006.01)

(52) U.S. Cl.
USPC .......................... 464/47; 464/68.1

(58) Field of Classification Search
USPC .................. 464/45–48, 68.1; 192/56.2, 56.6
See application file for complete search history.

(56) References Cited

U.S. PATENT DOCUMENTS

| | | | |
|---|---|---|---|
| 1,505,480 A | | 8/1924 | Manville |
| 2,090,397 A | * | 8/1937 | Haupt ................. 192/52.6 X |
| 3,025,686 A | * | 3/1962 | Lewis ................. 464/48 X |

(Continued)

FOREIGN PATENT DOCUMENTS

| | | |
|---|---|---|
| DE | 40 09 124 A1 | 9/1991 |
| FR | 1 231 034 A | 9/1960 |

(Continued)

OTHER PUBLICATIONS

International Preliminary Report on Patentability issued in International Application No. PCT/JP2010/056580 on Feb. 14, 2012.

(Continued)

*Primary Examiner* — Gregory Binda
*Assistant Examiner* — Josh Skroupa
(74) *Attorney, Agent, or Firm* — Birch, Stewart, Kolasch & Birch, LLP (57) ABSTRACT

A torque limiting device includes: a clutch disc clamp plate 17 having a surface area 13 where the surface and the outer area surface of the flywheel press or come in contact with each other, and is provided with an opening 16 at the center middle part of the clutch disc clamp plate 17 so that a concave space 14 is formed between the clutch disc clamp plate 17 and the fly wheel 2 when the clutch disc clamp plate 17 is fastened to the fly wheel 2; a clutch disc 18 fitted in the concave space, and connected to the driven apparatus; a clutch pressing plate 22 fitted between the clutch disc 18 and the fly wheel 2; and, at least one pressing means fitted to and in the flywheel 2 and presses the clutch pressing plate 22 in a surface contact condition.

4 Claims, 7 Drawing Sheets

(56) References Cited

U.S. PATENT DOCUMENTS

| | | | |
|---|---|---|---|
| 4,318,283 A * | 3/1982 | Windish | |
| 5,362,276 A * | 11/1994 | Fuehrer et al. | |
| 2002/0092715 A1 | 7/2002 | Yabe et al. | |
| 2003/0087704 A1 | 5/2003 | Takeuchi et al. | |
| 2005/0096138 A1 | 5/2005 | Takeuchi et al. | |
| 2008/0072427 A1 | 3/2008 | Uno | |

FOREIGN PATENT DOCUMENTS

| | | |
|---|---|---|
| JP | 56-95617 U | 12/1954 |
| JP | 51-36743 U | 3/1976 |
| JP | 54-3559 U | 1/1979 |
| JP | 7-214400 A | 8/1995 |
| JP | 2000-234635 A | 8/2000 |
| JP | 2003-194095 A | 7/2003 |
| JP | 2005-133859 A | 5/2005 |
| JP | 2006-017226 A | 1/2006 |
| JP | 2006-029358 A | 2/2006 |
| JP | 2008-144853 A | 6/2008 |
| JP | 2008-303995 A | 12/2008 |
| JP | 2008303995 A * | 12/2008 |

OTHER PUBLICATIONS

European Search Report issued in European Patent Application No. 10793902.7 on Nov. 26, 2012.

* cited by examiner

TORQUE LIMITING DEVICE

BACKGROUND OF THE INVENTION

1. Field of the Invention

The present invention relates to a torque limiting device that prevents a power supplying engine and a driven device driven by the engine from being loaded with the torque exceeding a predetermined limit not allowable for the engine and the driven device, when the torque (including torque fluctuations) is transferred from the power source engine to the driven device as well as from the driven engine to the power source engine.

2. Background of the Invention

In general, when mechanical power is transferred from an engine as a power source to a driven device, the system configured with the engine and the driven device is sometimes provided with a torque limiting device in order that the driven device is not damaged by an excessive torque that exceeds a predetermined level, the torque limiting device preventing the driven device.

In the torque limiting device, for instance, the friction facings of the outer periphery of a clutch disc are held between a pair of plates, whereby the plates press the friction facings from both the sides thereof; the plate on the power input side is connected to a member such as a flywheel as an engine side member, while the plate on the power output side is connected to a member such as an input shaft for the driven device.

Thereby, in a conventional clutch mechanism used as the torque limiting device, the plate thickness regarding the clutch pressing plates for pressing the clutch disc is thick; further, a release mechanism for intercepting and connecting the power transmission is integrated in the conventional clutch mechanism. Thus, the length in the axial direction becomes great, and the clutch mechanism is not well mounted on the whole system such as a vehicle.

On the other hand, when such a configuration as disclosed in Patent Reference JP2006-29358 is adopted, then the space saving and the cost reduction can be achieved

REFERENCES

Patent References

Patent Reference 1: JP2006-29358

SUMMARY OF THE INVENTION

Subjects to be Solved

Figure 7:
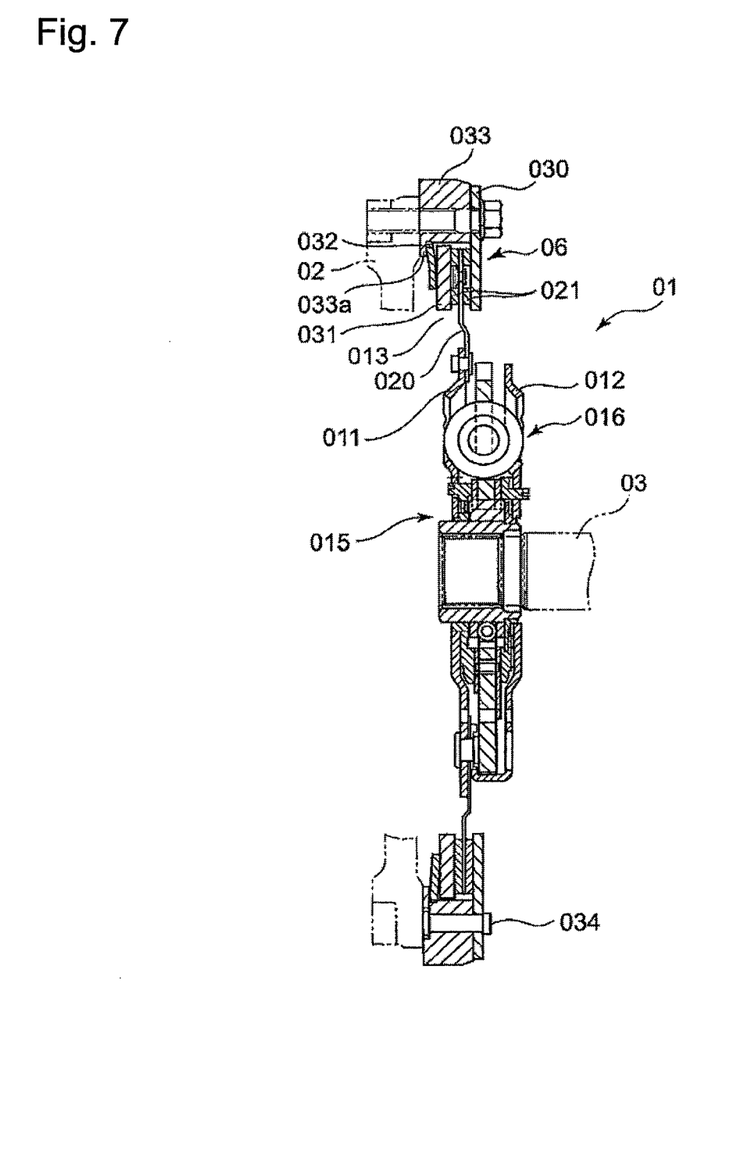

FIG. 7 shows a cross section of a torque limiting device according to Patent Reference 1.

The torque limiting device is set between a flywheel 02 and an input shaft (a power intake shaft) 03 of a transmission. The main components of the torque limiting device are a clutch plate 011 as a rotation body on the power intake side, a retaining plate 012, a clutch disc 013, a spline hub 015 as a rotation body on the power output side, and a damping mechanism 016 set between the rotation body on the power intake side and the rotation body on the power output side. The clutch plate 011 is a ring-shaped sheet metal; the retaining plate 012 is also a ring-shaped sheet metal. The clutch plate 011 and the retaining plate 012 are arranged so that a predetermined distance is kept between the plates 11 and 12; the clutch plate 011 is arranged on the engine side, while the retaining plate 012 is arranged on the transmission side. The clutch disc 013 includes, but not limited to, a cushion plate 020 fixed to the outer periphery of the clutch plate 011 and a pair of friction facings (an engine side friction facing and a transmission side friction facing) 021 fixed to both the sides of the cushion plate 020.

A torque limiting part 06 that limits the transmission torque includes, but not limited to: a first plate 030 and a second plate 031 that hold the engine side friction facing 021 and the transmission side friction facing 021 from the engine side and the transmission side respectively; a cone spring 032 that gives pressing forces for holding the friction facings to the first and second plates; and, a cover member 033 of a ring-shape that is arranged at the outer periphery of the clutch disc 013.

The first plate 030 is fixed to the transmission side of the cover member 033 by means of a plurality of rivets 034. Further, on the engine side of the inner periphery side of the cover member 033, a locking protrusion 033a of a ring-shape is formed so as to protrude inward.

At the inner periphery side of the cover member 033, the second plate 031 is arranged so that the second plate 031 together with the first plate 030 presses the friction facings 021; and, the cone spring 032 is placed between the second plate 031 and the locking protrusion 033a (of the cover member 033) so that the cone spring 031 is under a pre-compressed condition.

In the configuration of the conventional technology as described, the first plate 030 that is a ring-shaped plate and presses the friction facings 021 together with the second plate 031 is fixed to the cover member 033 by use of the rivets 034 and a plurality of bolts that fastens the cover member 033 to a flywheel 02; thereby, the stiffness of the first plate is not sufficient enough to be suitable for a highly-setting of torque limitation.

On the other hand, the means for giving the pre-compression force for pressing the friction facings to the second plate 031 is the cone spring 032; and, the line-contact is formed between the cone spring 032 and the second plate. Accordingly, the contact pressure distribution against the engine side friction facing 021 is inclined to be uneven; and, it becomes difficult to stabilize the limiting torque in order to obtain a torque limiting effect to be desired.

Moreover, since the line-contact between the cone spring 032 and the first plate 030 causes a locally high contact pressure distribution, uneven wear on the surface of the friction facings 021 is inclined to appear in the early stages; as a result, it becomes difficult to obtain a torque limiting effect to be desired.

In view of the difficulties in the conventional technology, the present invention aims at providing a torque limiting device by which a high torque limitation can be set without spoiling the superior stability and wear-resistance.

Means to Solve the Subjects

In order to overcome the above-described difficulties, the present invention discloses a torque limiting device for limiting power transmission thereby protecting an engine and a driven apparatus, the torque limiting device comprising:

a flywheel that is of an approximately circular disc shape and acts as a power output part of the engine;

a clutch disc clamp plate that is of a ring shape, having a surface area that is pressed to an outer area surface of the flywheel, the clutch disc clamp plate being provided with:

an opening at a center part of the clutch disc clamp plate; and a concave space formed between the clutch disc clamp plate and the fly wheel when the clutch disc clamp plate is fastened to the fly wheel;

a clutch disc that is fitted in the concave space, and connected to the driven apparatus;

a clutch pressing plate that is fitted between the clutch disc and the fly wheel; and at least one pressing means that is an elastic member fitted to and in the flywheel for pressing the clutch pressing plate so that the contact pressure on the surface of the clutch pressing plate is uniformly distributed, wherein the clutch disc is held between the fly wheel and the clutch disc clamp plate by use of the pressing force of the pressing means.

When the clutch disc clamp plate is fastened to the flywheel, a concave space of an annular shape is formed between the clutch disc clamp plate and the flywheel. Inside of the annular concave space, the clutch disc is housed. Thus, the stiffness of the clutch disc clamp plate in the clutch pressing direction can be enhanced.

Accordingly, the clutch disc can be pressed with enhanced forces (pressures), in the concave space between the clutch disc clamp plate and the flywheel. Further, by use of the pressing means as the elastic member that is fitted into one of the multiple holes provided at the flywheel, the clutch disc clamp plate can press the clutch pressing plate so as to achieve a uniform contact pressure distribution. Thus the clutch disc clamp plate can evenly come in contact with the clutch disc; the clutch holding performance (power or torque transfer capability) of the torque limiting device can be enhanced; and, the stability regarding the clutch holding performance as well as the wear resistance regarding torque limiting device can be enhanced.

Further, the pressing means is fitted to (and in) the flywheel, the length of the flywheel in the rotation axis direction can be short; thus, the torque limiting device can be easily mounted on vehicles.

Furthermore, the clutch disc clamp plate is fastened to the flywheel so as to form the concave space; thereby, the clutch disc clamp plate has the thickness in the rotation axis direction regarding the flywheel. Thus, the clutch disc clamp plate has advantageously inertia mass and can be also have the function of a flywheel.

A preferable embodiment of the present invention as disclosed above is the torque limiting device, wherein the clutch disc clamp plate is tapered so that a rotation axis direction length of the concave space formed between the clutch disc clamp plate and the fly wheel becomes shorter, along the direction toward a rotation axis.

The clutch disc clamp plate is provided with the opening at the center middle part thereof; accordingly, the stiffness of the inner area around the opening is lower than the outer area. Thus, when the clutch disc clamp plate is pressed with the pressing force from the elastic member via the clutch pressing plate, the clutch disc clamp plate deforms toward the outerside thereof in the rotation axis direction.

According to the configuration as described above, the rotation axis direction length of the concave space formed between the clutch disc clamp plate and the fly wheel becomes shorter, along the direction toward the rotation axis; and, the bottom wall face of the clutch disc clamp plate the bottom wall face which faces the flywheel side is tapered. Therefore, when the deformation is estimated in advance, it becomes feasible that the contact pressure between the clutch disc clamp plate and the clutch disc is evenly distributed. In this way, uneven wear of the clutch disc can be prevented.

Further, the clutch holding performance (power or torque transfer capability) of the torque limiting device can be enhanced; and, the stability regarding the clutch holding performance as well as the wear resistance regarding torque limiting device can be enhanced.

Another preferable embodiment of the present invention is the torque limiting device, the clutch disc including, but not limited to:

a pair of friction facings that is held between the clutch disc clamp plate and the clutch pressing plate;

a cushion plate that is of a circular shape holding the friction facings and having an opening whose center axis approximately matches with the rotation axis of the flywheel;

a hub member that is fitted at an outer periphery side of an output shaft which outputs the torque transferred from the flywheel via the cushion plate toward the driven apparatus side;

a dampener part of which an outer periphery side is connected to the cushion plate while an inner periphery side of the dampener part is connected to the hub member, so that the dampener part is elastically connected in a rotation hoop direction of the output shaft, wherein a coupling position of the cushion plate and the dampener part is placed on the flywheel side of the dampener part, and the dampener part is arranged in the opening at the center part of the clutch disc clamp plate.

With the configuration as described above, the dampener part can be arranged in the opening at the center middle part of the clutch disc clamp plate. Thus, useless space can be dispensed with; the length of the torque limiting device in the rotation axis direction can be short.

Another preferable embodiment of the present invention is the torque limiting device, wherein the pressing means as the elastic member is a coil spring and is fitted into one of multiple holes provided to the flywheel, the holes being arranged around a rotation axis of the flywheel in a way that each of the holes is approximately parallel to the rotation axis of the flywheel.

When the configuration as described above is adopted, the coil springs are arranged so that the center axis of each hole is parallel to the rotation axis of the flywheel and the center axes of the holes are arranged around the rotation axis of the flywheel. For instance, the coil springs are arranged so that the center axes of the coil springs pass through the points on a circle whose center is on the rotation axis of the flywheel, the circle plane being included in a plane vertical to the rotation axis of the flywheel. Or, the coil springs are arranged so that the center axes of the coil springs pass through the points on the two concentric circles whose centers are on the rotation axis of the flywheel, each circle plane being included in a plane vertical to the rotation axis of the flywheel; and, the centers of the holes are placed in a staggered arrangement. In these cases, the pressing forces on the friction facing can be uniformly distributed; and the adjustment (e.g. the adjustment regarding the numbers of the coil springs to be provided or the spring constants of the coil springs) regarding the torque limiting force can be easily performed.

Further, the spring is a coil spring; and the pressing force from the coil spring toward the clutch pressing plate distributes on an annular area around the center of the hole into which the coil spring is fitted; namely, the annular area is the contact area regarding the coil spring and the clutch pressing plate, and the contact area can be wide to an extent of the hole cross-section area. Thus, the contact pressure regarding the friction facing can be evenly distributed. Accordingly, uneven wear (partial wear) regarding the friction facing can be prevented. A high holding force regarding the torque limiting device can be obtained, and the stability of the holding force can be achieved. In addition, the durability of the clutch disc can be enhanced.

Furthermore, each coil spring is housed in a hole drilled on the surface of the flywheel; thus, the coil spring can be stably fitted to the flywheel, and the length of the whole device in the rotation axis direction can be constrained.

Another preferable embodiment of the present invention is the torque limiting device, wherein at least one shim is arranged at the surface area of the clutch disc clamp plate where the clutch disc clamp plate is pressed to the flywheel.

With the configuration as described above, in a case where there are the dimension deviations regarding the pressing members as the pressing means or regarding the friction facings, or in a case where a planned transfer torque is not achieved, for instance, because of the wear of the friction facings, the pressing force regarding the pressing members can be easily adjusted by changing the numbers of shim layers.

Further, when the shim is divided into segments, the numbers of shims or shim layers can be adjusted without fully disassembling the torque limiting device.

Effects of the Invention

According to the torque limiting device as per the present invention, the clutch disc clamp plate is fastened to the flywheel, and a concave space of an annular shape is formed between the clutch disc clamp plate and the flywheel. Inside of the annular concave space, the clutch disc is housed. Thus, the stiffness of the clutch disc clamp plate in the clutch pressing direction can be enhanced.

In this way, the flywheel and the clutch disc clamp plate can press the clutch disc with enhanced forces (pressures). The whole area of the friction facing can evenly come in contact with the clutch disc clamp plate as well as the clutch pressing plate as a pressing means. Thus, the clutch holding performance (power or torque transfer capability) of the torque limiting device can be enhanced; and, the stability regarding the clutch holding performance as well as the wear resistance regarding torque limiting device can be enhanced.

Further, the concave space houses the clutch disc; thus, the length of the whole torque limiting device in the rotation axis direction can be constrained. The degree of freedom in fitting the torque limiting device between the power drive source and the driven apparatus can be enhanced.

BRIEF DESCRIPTION OF THE DRAWINGS

FIGS. 5(A), 5(B) and (5C) show the cross-section views of the torque limiting device according to a second mode of the present invention;

FIG. 5(A) shows the cross-section according to the second mode;

DESCRIPTION OF THE INVENTION

Hereafter, the present invention will be described in detail with reference to the modes or the embodiments shown in the figures. However, the dimensions, materials, shape, the relative placement and so on of a component described in these modes or embodiments shall not be construed as limiting the scope of the invention thereto, unless especially specific mention is made.

First Embodiment

Figure 1:
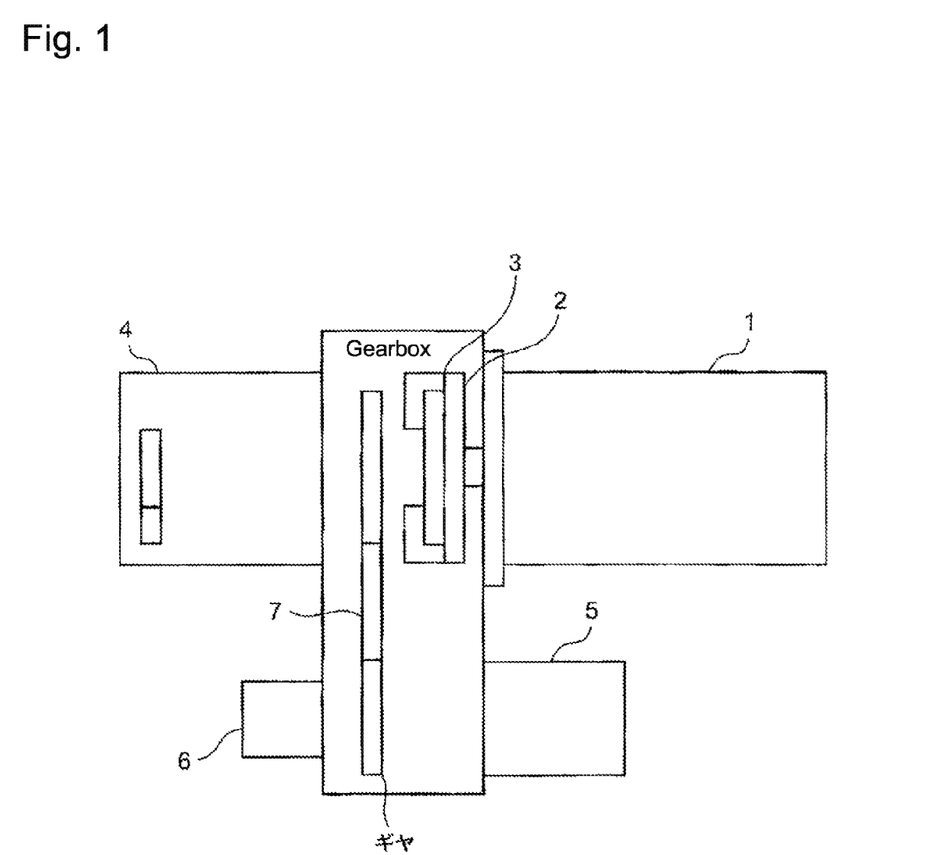
FIG. 1 shows an outline of an example of the power line (the power transmission line as a whole system) in which the device according to the present invention is integrated.

FIG. 1 shows an outline of an example of the power line (the power transmission line as a whole system) in which the device according to the present invention is integrated; in FIG. 1, the whole system includes, but not limited to: an engine 1; a flywheel 2 that is a power output part of the engine; a torque limiting device 3 according to the present invention, the device 3 being integrated inside of the flywheel (or by the side of), the device 3 limiting the to-be-transferred torque to less than an allowable level; a transmission 4; a speed reduction mechanism 7 that is provided with gears, the output shaft of the torque limiting device 3 being connected to the input shaft of the transmission 4, via the gears of the speed reduction mechanism 7. Further, the gears of the speed reduction mechanism 7 are connected to, for instance, a driving device for a forklift.

In addition, the whole system includes, but not limited to: a motor (a motor-generator) 5 that is connected to the output shaft of the torque limiting device 3 via the gears configuring the speed reduction mechanism 7, and has the function (as a motor) of starting the engine, the function (as generator) of generating electric power by use of the power output of the engine and the function of supplying auxiliary power to the engine; and, a hydraulic pump 6 that acts an power source for the working apparatus of the forklift, the axis of the driving shaft of the hydraulic pump being arranged concentrically with the axis of the shaft of the motor 5 in FIG. 1.

Figure 2:
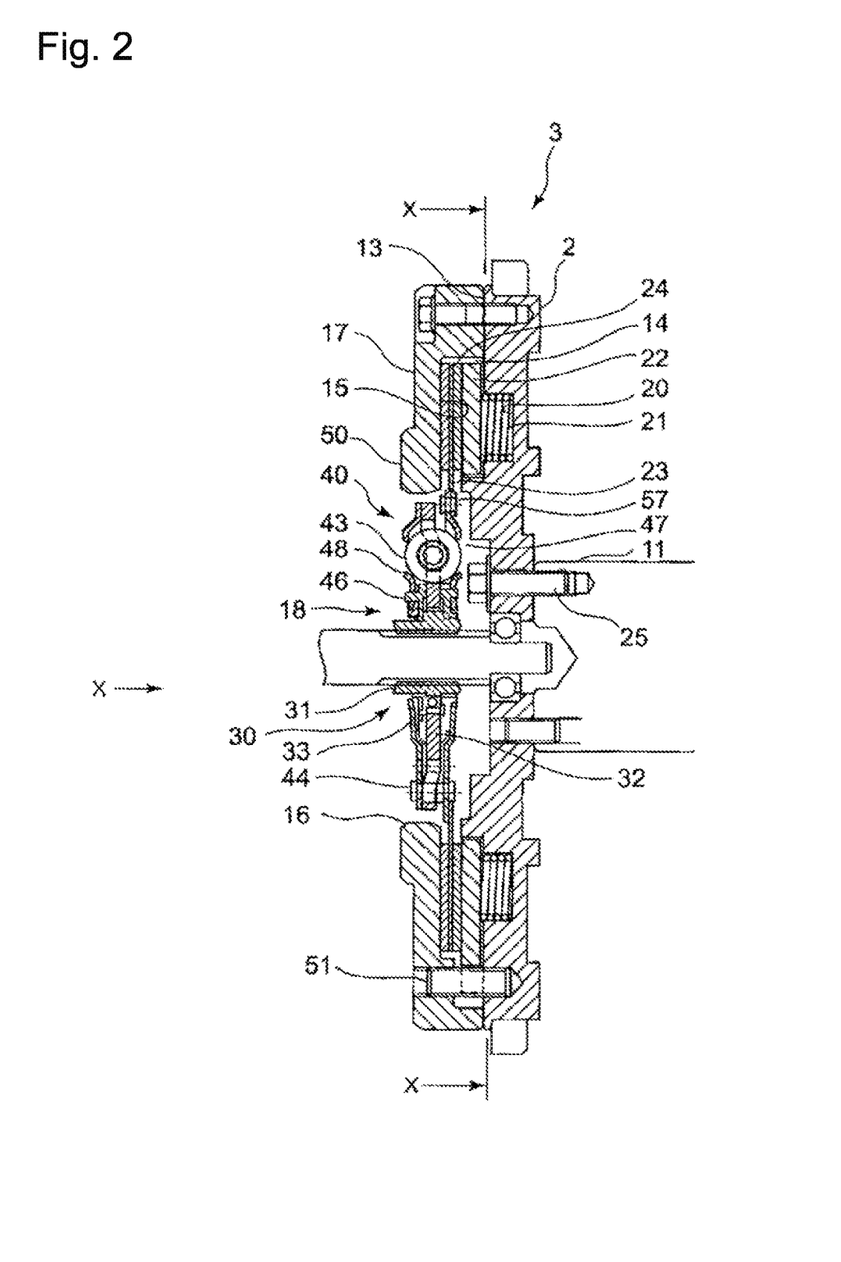
FIG. 2 shows a cross section view of a torque limiting device according to a first mode of the present invention.

FIG. 2 shows a longitudinal cross-section view of the torque limiting device 3. The torque limiting device 3 is fixed to an output shaft 11 of the engine, and forms a rotation body so as to transfer the driving power of the engine. Further, the torque limiting device 3 includes, but not limited to: the flywheel 2 that has the function of smoothing the engine speed fluctuations; and, a clutch disc clamp plate that is of shape of a pan having a hollow central bottom (namely, the central bottom of the pan is an opening) is located so that the inner area of the flywheel on the transmission side is seen through the opening, the clutch disc clamp plate 17 and the outer side part of the flywheel 2 forming a rectangular concave shape in a longitudinal cross-section such as shown in FIG. 2.

Further, the clutch disc clamp plate 17 is fastened to the flywheel 2; and, a concave space 14 is formed between the clutch disc clamp plate 17 and the flywheel 2.

Further, the clutch disc clamp plate 17 according to the present mode is needed to be stiff and expected to have the function of a flywheel.

Moreover, along all the circumference around the opening 16, a flange part 50 of a ring shape protrudes toward the transmission from a surface of the transmission side of the clutch disc clamp plate 17, the surface being the opposite side surface against the engine side surface that faces a clutch disc 18.

The flange part 50 ensures the stiffness (around the opening 16) so as to bear the load when the flywheel 2 presses the clutch disc 18 against the clutch disc clamp plate 17; the explanation regarding the clutch disc 18 is given again later.

In the concave space 14 that is formed by the clutch disc clamp plate 17 and the flywheel 2, the clutch disc 18 of the torque limiting device 3 is placed so that the rotation axis of the clutch disc 18 is approximately agrees with rotation axis of the flywheel 2.

Figure 3:
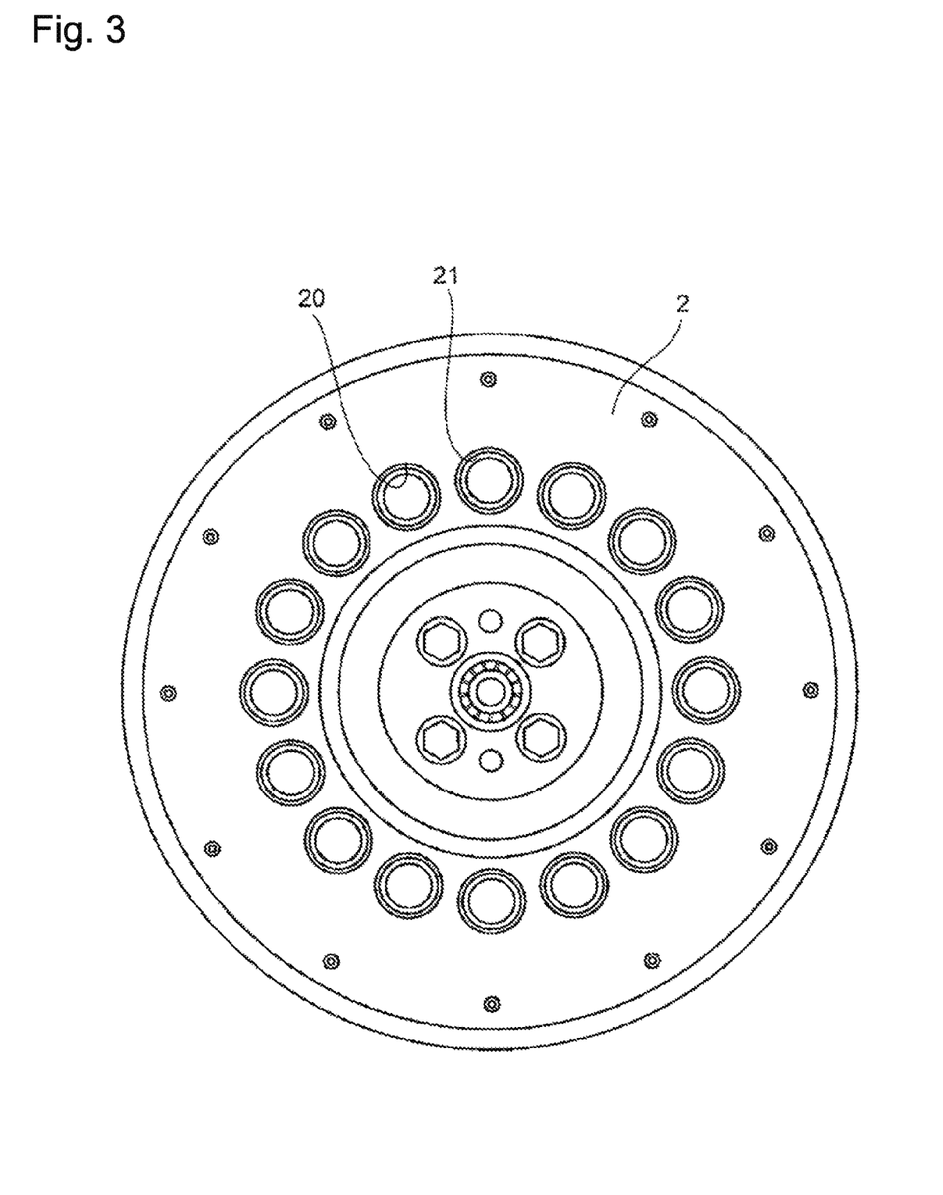
FIG. 3 shows the X-arrow view in FIG. 2.
Figure 4:
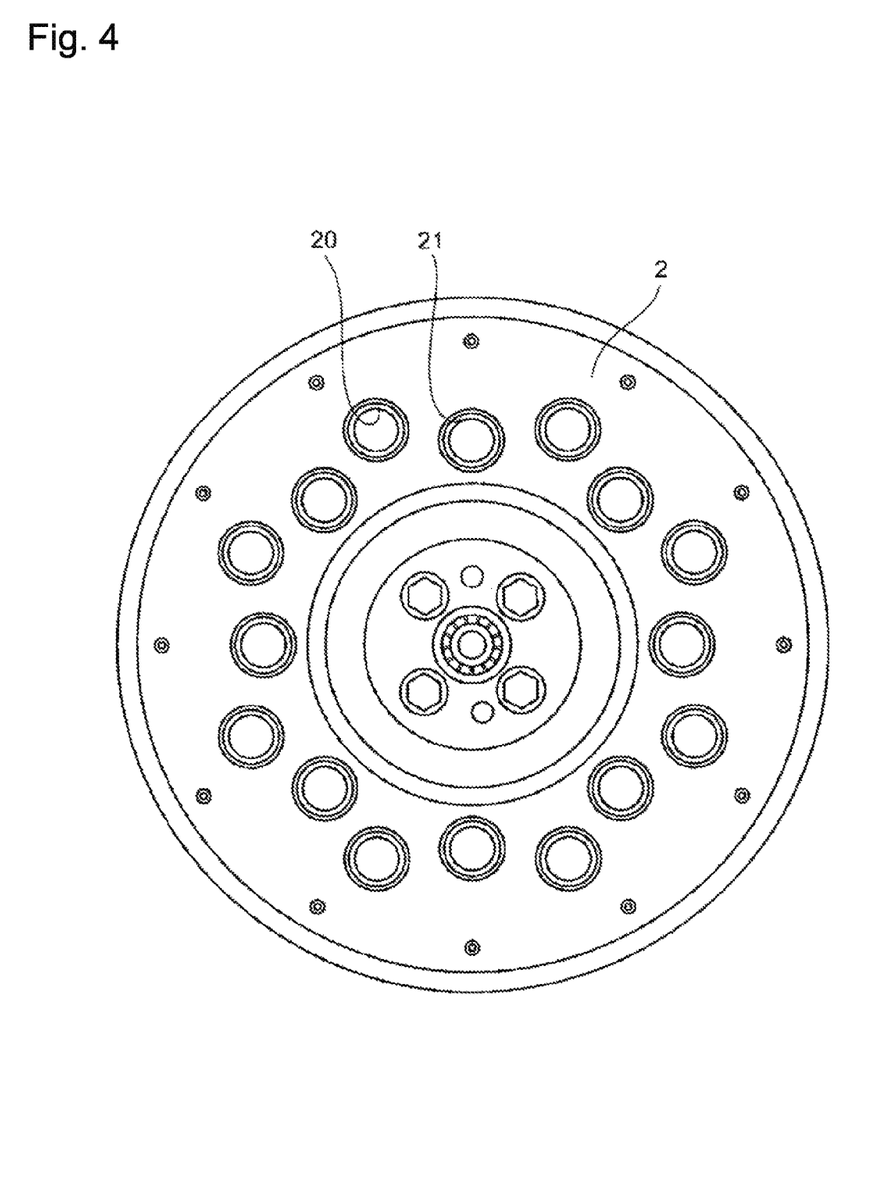
FIG. 4 shows a view of another arrangement regarding the coil springs in FIG. 3.

Further, as shown in FIGS. 3 and 4, the flywheel 2 is provided with a plurality of holes 20 that are drilled on a transmission side surface of the fly wheel; thereby, the transmission side surface faces the side wall surface of the clutch disc 18; and, the center axis of each hole is approximately parallel to the axis of the center line (the rotation axis) of the flywheel 2. In each hole 20, a coil spring 21 is fitted in a pre-compressed state. The holes 20 for fitting the coil springs 21 are, for example, arranged so that the center of each hole is on a circle whose center is on the rotation axis of the flywheel 2. Or, the center of each hole is, for example, on one of two circles whose centers are on the rotation axis of the flywheel 2; and, the centers of the holes are placed in a staggered arrangement. Thus, the coil springs 21 are inserted into the holes 20.

Moreover, a clutch pressing plate 22 is set between the coil springs 21 and the clutch disc 18. The coil springs 21 and the clutch pressing plate 22 configure the pressing means by which the clutch disc 18 is pressed against the clutch disc clamp plate 17. According to the circular arrangement on a circle or the staggered arrangement on two circles regarding the multiple coil springs 21 as described above, the clutch pressing plate 22 can evenly press the whole clutch disc 18.

Moreover, owing to the staggered arrangement regarding the coil springs 21, the clutch pressing plate 22 can further evenly press the whole clutch disc 18.

Further, by increasing or decreasing the numbers of the coil springs 21, or by changing the spring constant, the limit regarding the driving power (the torque) to be transferred can be adjusted.

In addition, the arrangement regarding the coil springs 21 is not limited to the above-described arrangements; the arrangement may realize evenly distributed contact pressure.

Further, the clutch pressing plate 22 is arranged so that a slight clearance is provided between the surface of the clutch pressing plate 22 and the surface of the flywheel 2. This clearance prevents the clutch disc clamp plate 17, the clutch pressing plate 22 and the flywheel 2 from directly (i.e. in one go) holding the clutch disc 18 (in order to evade the loss of torque limiting function); thereby, the dimension errors in manufacturing the members causes the loss of torque limiting function.

Further, in order that the clutch pressing plate 22 transfers the driving power (torque) from the flywheel 2 to the clutch disc 18, and is simultaneously able to move to and fro along the rotation axis of the flywheel 2 or the clutch disc 18, a plurality of knock pins 51 that are fitted in the holes provided on the surface of the flywheel 2 is arranged so that the clutch disc clamp plate 17 slides on the knock pins 51; thereby, the holes (cutouts) are arranged at the outer periphery part of the clutch pressing plate 22, and the cutouts are arranged on the transmission side of the flywheel.

The clutch disc 18 is held between and pressed by the clutch pressing plate 22 and the clutch disc clamp plate 17; and, the clutch disc 18 comes in contact with the clutch pressing plate 22 and the clutch disc clamp plate 17. Thereby, the friction resistance due to the contact pressure transfers the power (torque) from the flywheel 2 to the speed reduction device 7.

The clutch disc 18 is provided with a pair of friction facings 24 at the outer regions of the clutch disc 18; the friction facings 24 is fixed to both sides of the clutch disc 18 by means of fixing members such as rivets, so that the friction resistance against the relative movements between the friction facing 24 and the clutch pressing plate 22, as well as, between the friction facing 24 and the clutch disc clamp plate 17 is increased, while the friction facings 24 come in contact with the clutch pressing plate 22 and the clutch disc clamp plate 17. Further, when the rotation torque to be transferred from the engine side to the transmission side exceeds a prescribed limit, then the friction facings slip on the clutch pressing plate 22 and the clutch disc clamp plate 17. Moreover, the clutch disc 18 is provided with:

a cushion plate 23 of a circular disc shape having a punching hole (a circular opening) in the central part thereof;

a spline hub 30 for engaging with the input shaft of the transmission 4 by means of a spline joint mechanism, the axis of the input shaft of the transmission 4 approximately coinciding with the rotation axis (the central line) of the flywheel 2; and, a dampener part 40 for damping the rotation speed fluctuations (e.g. regarding a hoop direction speed fluctuations), the dampener being arranged around the outer regions of the spline hub 30.

Between the spline hub 30 and the cushion plate 23, the torsion spring 33 or 43 is arranged so as to configure the dampener part 40 by which the speed fluctuations are damped so that the torsion angle fluctuations regarding the torsion spring in response to the speed fluctuations is elastically cushioned when the fluctuation torsion angle is within a predetermined angle range.

In a case where the fluctuation torsion angle exceeds the lower upper bound or the upper bound of the predetermined angle range, the engine and the transmission are supposed to be (not elastically but) rigidly connected to each other.

In addition, the clutch plate 41 (of the clutch disc 18) is connected to the periphery circumference part of the opening regarding the cushion plate 23 and arranged on the flywheel side of the spline hub 30. Thus, the dampener part 40 is arranged so as to be fitted into the opening 16 (regarding the clutch disc clamp plate 17).

In this way, the dampener part 40 is arranged so as to be fitted into the opening 16 regarding the clutch disc clamp plate 17; the length of the torque limiting device in the rotation axis direction in relation to the flywheel 2 can be reduced. Hence, the degree of freedom regarding the installation of the device can be enhanced.

Next, the operating conditions as to the torque limiting device are hereby explained.

The driving torque outputted from the engine via the output shaft 11 is transferred to the flywheel 2 (as a power output rotation body) via the fastening bolts 25 and knock pins; hereby, the flywheel 2 together with the fastening bolts 25 and the knock pins 26 may be regarded as an integrated power output rotation body.

The clutch disc 18 is held between clutch pressing plate 22 and the clutch disc clamp plate 17 that is integrated with the flywheel 2; thus, the clutch disc 18 is pressed from both sides and comes in contact with the both sides. Friction resistance force is generated between the friction facing 24 and the clutch pressing plate 22 as well as between the friction facing 24 and the clutch disc clamp plate 17; owing to the friction force, the driving torque produced by the engine is transferred the clutch plate 41 (corresponding to the member 011 in FIG. 7) via the cushion plate 23.

According to the present mode as described above, the clutch disc clamp plate 17 and the flywheel 2 form the concave space 14; and, the concave space 14 becomes a space that houses the clutch disc 18. Hence, the stiffness (in the clutch pressing direction) regarding the torque limiting device is enhanced; and, the deformation of the device can be reduced. Accordingly, the torque limitation level to be established can be easily achieved; further, the stability regarding the quality can be maintained.

Further, owing to the enhanced stiffness, the clutch disc 18 can be pressed with an enhanced pressing force; thus, the torque to be transferred by the torque limiting device can be enhanced.

Further, the length of the dampener part 40 is greater than the length of the friction facings 24 (and the length of the dampener part 40 together with the friction facings 24 is conventionally long in the shaft axis direction); therefore, in the present invention, the clutch plate to which the cushion plate 23 (in which the friction facings 24 are arranged) is fitted on the flywheel side; and, the dampener part 40 is placed at the opening 16 regarding the clutch disc clamp plate 17. In this way, the length in the shaft axis direction regarding the device and the flywheel 2 can be reduced; the efficiency for mounting the device onto vehicles or the like can be enhanced.

Further, the elastic members as the pressing means are fitted into the multiple holes that are drilled on the transmission side surface of the flywheel 2; thereby, the center axis of the each hole is parallel to the rotation axis of the flywheel 2, and the center of the hole is on a circle whose center is on the rotation axis of the flywheel 2. Hereby, it is incidentally noted that the coil spring 21 is used as the elastic member in the explanation thus far. In this way, the pressing force of the clutch pressing plate 22 toward the friction facing 24 can be uniformly distributed. Further, the pressing force from the coil spring toward the clutch pressing plate 22 distributes on an annular area around the center of the hole into which the coil spring 21 is fitted; namely, the annular area is the contact area regarding the coil spring and the clutch pressing plate 22, and the contact area can be wide to an extent of the hole cross-section area. Thus, the contact pressure regarding the friction facing 24 and the clutch pressing plate 22 can be evenly distributed. Accordingly, uneven wear (partial wear) regarding the friction facing 24 can be prevented. A high holding force regarding the torque limiting device can be obtained, and the stability of the holding force can be achieved.

Further, when the centers of the coil springs are arranged on two concentric circles, in a staggered arrangement, the clutch pressing plate 22 can further uniformly press the clutch disc 18. Thus, a further stable holding force regarding the torque limiting device can be obtained, and the stability of the holding force can be achieved.

Further, in a case where momentary impact torque is transferred through the torque limiting device, the friction facing 24 can slip on the clutch pressing plate 22 as well as the clutch disc clamp plate 17. Accordingly, even in such a case, the dampener part 40 as well as the apparatus integrated into the spline hub 30 can be prevented from being damaged.

Second Embodiment

Figure 5A:
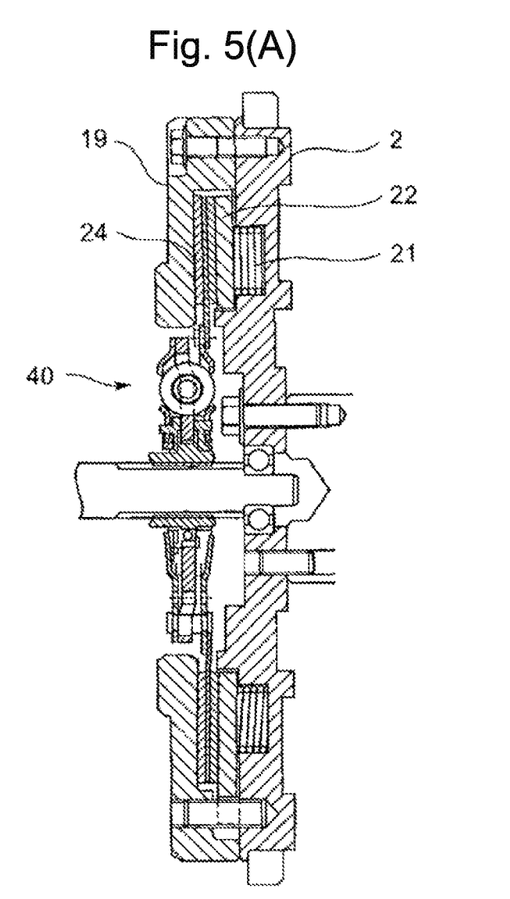
Figure 5B:
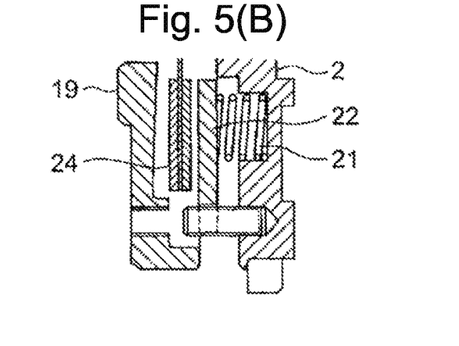
FIG. 5(B) shows the cross-section in which a clutch disc clamp plate is depicted in a free condition.
Figure 5C:
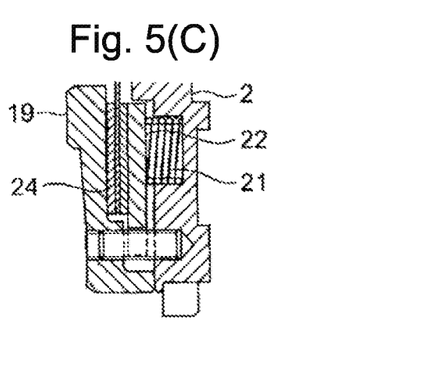
FIG. 5(C) shows the cross-section in which a clutch disc clamp plate is depicted in a condition where the disc clamp plate is pressed against a clutch pressing plate by means of a pressing means.

Based on FIGS. 5(A), 5(B) and 5(C), the torque limiting device according to a second mode of the present invention is now explained.

In this second mode, the wall face of the clutch disc clamp plate 19, the face which faces the side surface of the friction facing 24 provided at the outer regions of the clutch disc 18, is tapered so that the distance between the friction facing and the wall face becomes shorter as the radius (the distance from the rotation axis) of the position on the wall face becomes small; hereby, the distance between the friction facing and the wall face is a distance in a pressing force free condition.

The reason for the above-described contrivance is that the deformation of the clutch disc clamp plate 19 is estimated in advance; namely, since the clutch disc clamp plate 19 has an opening 16 in the central part thereof, the area in the neighborhood of the opening is inclined to deform in the rotation axis direction in comparison with the outer area of the clutch disc clamp plate 19, when the clutch disc clamp plate 19 is pressed by the force from the elastic members via the clutch pressing plate 22 and the clutch disc, in the rotation axis direction.

FIG. 5(A) shows the cross-section views of the torque limiting device according to a second mode; FIG. 5(B) shows, for convenience, the cross-section that depicts a clutch disc clamp plate, in a free condition, namely, before the clutch disc clamp plate 19 and the flywheel 2 are fastened by bolts.

FIG. 5(C) shows, for convenience, the cross-section that depicts the clutch disc clamp plate in a condition where the clutch disc clamp plate 19 is pressed by the clutch pressing plate 22 and the coil springs as the pressing means. In FIG. 5(C), the deformation state of the bottom wall of the rectangular concave-shaped space (the pan shaped space) inside the clutch disc clamp plate 19 is depicted.

According to this mode of the present invention, the clutch disc clamp plate 19 as well as the clutch pressing plate 22 and the coil springs 21 as the pressing means presses the friction facings 24; thereby, in the clutch disc clamp plate 19, the contact pressure of the inner region becomes lower than the contact pressure of the outer region. Therefore, in allowing for the deformation of the clutch disc clamp plate 19 in advance, the bottom wall of the rectangular concave-shaped space inside the clutch disc clamp plate 19 is tapered so that the distance between the friction facing and the bottom wall face becomes shorter as the radius (the distance from the rotation axis) of the position on the bottom wall face becomes small; hereby, the distance between the friction facing and the bottom wall face is a distance in a pressing force free condition. In this way, the contact pressure between the friction facing 24 of the clutch disc 18 and the clutch disc clamp plate 19 as well as between the friction facing 24 of the clutch disc 18 and the clutch pressing plate 22 can be evenly distributed. Thus, uneven wear of the friction facings 24 can be surely prevented.

Figure 6:
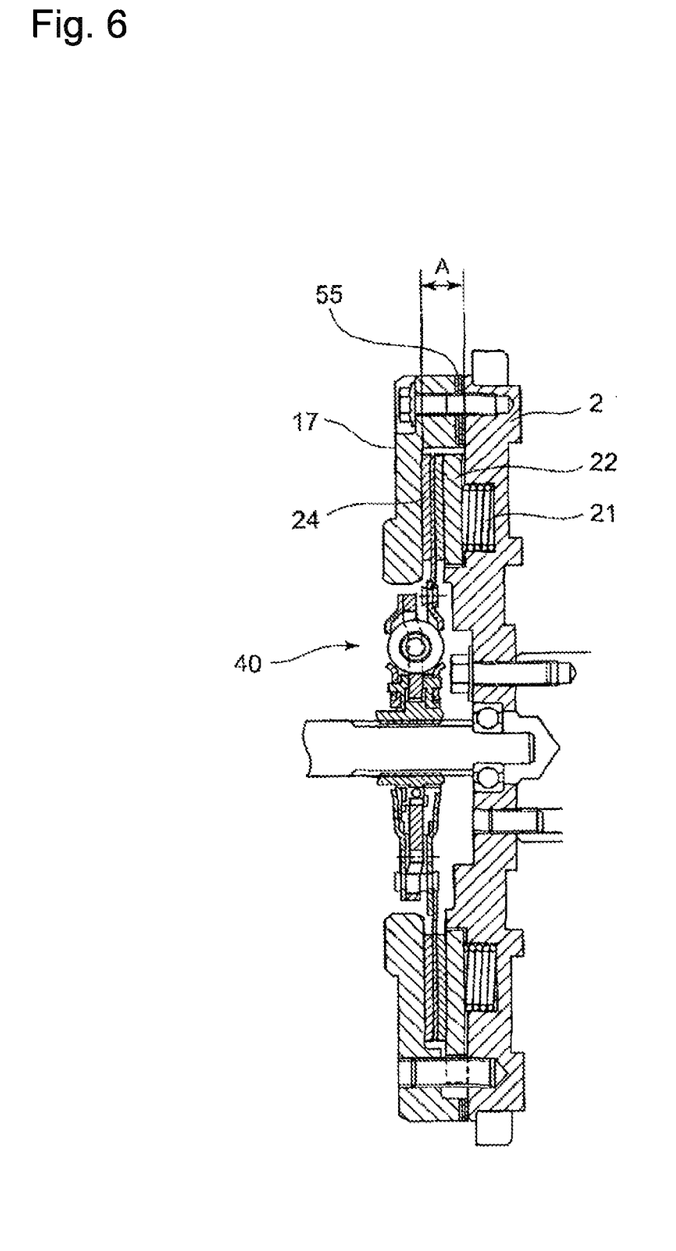
FIG. 6 shows the cross-section views of a third mode of the present invention; and, FIG. 7 shows a cross section of a torque limiting device according to a conventional technology.

Based on FIG. 6, the torque limiting device according to a third mode of the present invention is now explained.

In this third mode, at least one shim 55 is arranged between the clutch disc clamp plate 19 and the flywheel 2, in an area where the clutch disc clamp plate 19 and the flywheel 2 press each other. Thus, the distance A (FIG. 6) becomes adjustable, for instance, by increasing or decreasing the numbers of shims; thereby, the distance A is the distance between the contact surface where the flywheel 2 and the clutch pressing plate 22 come in contact with each other, and the contact surface where the clutch disc clamp plate 19 and the friction facing 24 come in contact with each other.

In a case where there are the dimension deviations regarding the pressing members as the pressing means or regarding the friction facings 24, or in a case where a planned transfer torque is not achieved, for instance, because of the wear of the friction facings 24, the distance A is adjusted. In this way, the planned transfer torque can be achieved.

Further, when the shim is divided into segments, the numbers of shims or shim layers can be adjusted without fully disassembling the torque limiting device.

INDUSTRIAL APPLICABILITY

The present invention realizes a torque limiting device by which a high torque limitation can be set without spoiling the superior stability and wear-resistance. Accordingly, the torque limiting device can be suitably used for the protection of the power transmission line in the vehicles such as a forklift in which a driven apparatus such as the speed reduction mechanism is provide on the power transmission line.

The invention claimed is:

1. A torque limiting device for limiting power transmission thereby protecting an engine and a driven apparatus, the torque limiting device comprising:
  a flywheel that is of an approximately circular disc shape and acts as a power output part of the engine;
  a clutch disc clamp plate that is of a ring shape, having a surface area that is pressed to an outer area surface of the flywheel, the clutch disc clamp plate being provided with:
    an opening at a center part of the clutch disc clamp plate; and
    a concave space formed between the clutch disc clamp plate and the flywheel when the clutch disc clamp plate is fastened to the fly wheel;
  a clutch disc that is fitted in the concave space, and connected to the driven apparatus;
  a clutch pressing plate that is fitted between the clutch disc and the flywheel; and
  at least one pressing means that is an elastic member fitted to and in the flywheel for pressing the clutch pressing plate so that the contact pressure on the surface of the clutch pressing plate is uniformly distributed,
  wherein
  the clutch disc is held between the flywheel and the clutch disc clamp plate by use of the pressing force of the pressing means, and
  wherein the clutch disc clamp plate includes,
    an inner wall face which is tapered and facing the clutch disc, such that a width of the concave space in a rotation axis direction of the flywheel becomes narrower from an outer periphery side toward a rotation axis side in a pressing force free condition,
    an outer wall face at a circumference of the opening at the center part of the clutch disc clamp plate, the outer wall face being a wall face opposite to the inner wall face, and
    a flange part of a ring shape provided on the outer wall face of the clutch disc clamp plate, the flange part being formed so as to protrude in a direction toward the transmission along an entire circumference of the opening.

2. The torque limiting device according to claim 1, wherein the clutch disc comprises:
  a pair of friction facings that is held between the clutch disc clamp plate and the clutch pressing plate;
  a cushion plate that is of a circular shape holding the friction facings and having an opening whose center axis approximately matches with the rotation axis of the flywheel;
  a hub member that is fitted at an outer periphery side of an output shaft which outputs the torque transferred from the flywheel via the cushion plate toward the driven apparatus side;
  a dampener part of which an outer periphery side is connected to the cushion plate while an inner periphery side of the dampener part is connected to the hub member, so that the dampener part is elastically connected in a rotation hoop direction of the output shaft,
  wherein
  a coupling position of the cushion plate and the dampener part is placed on the flywheel side of the dampener part, and
  the dampener part is arranged in the opening at the center part of the clutch disc clamp plate.

3. The torque limiting device according to claim 1, wherein the pressing means as the elastic member is a coil spring and is fitted into one of multiple holes provided to the flywheel, the holes being arranged around a rotation axis of the flywheel in a way that each of the holes is approximately parallel to the rotation axis of the flywheel.

4. The torque limiting device according to claim 1, further comprising:
  at least one shim provided at the surface area of the clutch disc clamp plate where the clutch disc clamp plate is pressed to the flywheel.

* * * * *